US008491444B1

(12) United States Patent
Li et al.

(10) Patent No.: US 8,491,444 B1
(45) Date of Patent: Jul. 23, 2013

(54) TRANSMISSION CONTROL SYSTEM (75) Inventors: Wei Li, Peoria, IL (US); Randall Todd Anderson, Peoria, IL (US); Brian Douglas Hoff, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/436,084

(22) Filed: Mar. 30, 2012

(51) Int. Cl.
*F16H 61/00* (2006.01)

(52) U.S. Cl.
USPC .................... 477/118; 477/109; 477/140

(58) Field of Classification Search
USPC ............. 477/109, 110, 115, 118, 135, 140, 477/141, 144
See application file for complete search history.

(56) References Cited

U.S. PATENT DOCUMENTS

| | | |
|---|---|---|
| 5,136,495 A | 8/1992 | Tokoro et al. |
| 5,419,128 A | 5/1995 | Asano et al. |
| 5,446,362 A | 8/1995 | Vanek et al. |
| 6,094,617 A | 7/2000 | Lapke |
| 6,192,306 B1 | 2/2001 | Kidokoro et al. |
| 6,240,356 B1 | 5/2001 | Lapke |
| 6,379,282 B1 | 4/2002 | Aoki |
| 6,385,970 B1 | 5/2002 | Kuras et al. |
| 7,192,374 B2 | 3/2007 | Kuras et al. |
| 7,214,166 B2 | 5/2007 | Steen et al. |
| 7,331,172 B2 | 2/2008 | Persson |
| 7,380,396 B2 | 6/2008 | Kresse |
| 7,481,207 B2 | 1/2009 | Evans |
| 2008/0207398 A1 | 8/2008 | Dvorak et al. |
| 2009/0143948 A1 | 6/2009 | Dahl et al. |

OTHER PUBLICATIONS

D. Anderson, "Splined speed control using SpAM (Speed-based Acceleration Maps) for an autonomous ground vehicle," Thesis submitted to the faculty of the Virginia Polytechnic Institute and State University in partial fulfillment of the requirements for the degree of Master of Science in Mechanical Engineering, Jan. 14, 2008, pp. 1-46.

*Primary Examiner* — Justin Holmes
(74) *Attorney, Agent, or Firm* — Finnegan, Henderson, Farabow, Garrett & Dunner LLP (57) ABSTRACT

A method of controlling a machine transmission includes determining a first target torque of the transmission. The first target torque includes a combination of a torque limit associated with a power source of the machine and a virtual retarding torque. The method also includes directing the transmission to generate a first output corresponding to the first target torque. The first output of the transmission increases a speed of the power source from a first power source speed to a second power source speed and decreases a travel speed of the machine from a first travel speed to a second travel speed. The method further includes determining that the first target torque is not equal to the torque limit, and determining a second target torque of the transmission in response. The second target torque is less than the first target torque.

20 Claims, 3 Drawing Sheets

TRANSMISSION CONTROL SYSTEM

TECHNICAL FIELD

This disclosure relates generally to a control system and, more particularly, to a system and method of controlling a transmission.

BACKGROUND

Machines such as, for example, wheel loaders, track type tractors, and other types of heavy machinery can be used for a variety of tasks. These machines include a power source, which may be, for example, an engine, such as a diesel engine, gasoline engine, or natural gas engine that provides the power required to complete such tasks. To effectively maneuver the machine during performance of such tasks, the machines also include a transmission that is capable of transmitting the power generated by the engine to various drivetrain components of the machine over a wide range of conditions.

For example, such machines commonly use a continuously variable transmission ("CVT") to direct engine torque to traction devices, such as wheels or tracks, that propel the machine. A CVT is capable of providing a desired output torque to such components, at any speed within its operating range, by continuously changing the ratio of the transmission. The engine and/or the CVT may also be used to assist in braking the machine. For example, during operations in which the machine is required to change travel directions at relatively high load, the engine and the CVT may be configured to provide a retarding torque to the traction devices in order to stop the machine.

For example, upon loading an exemplary wheel loader bucket with material from a pile, the wheel loader may be directed to travel in a reverse direction away from the pile. While traveling in the reverse direction under such a relatively high load, the wheel loader may be controlled to stop, and to move in a forward direction so that the material can be carried to a dump truck, or other unload location. Although engine speed may be increased during such high-load direction changes to provide retarding torque to the traction devices via the CVT, the combined retarding torque provided by the engine and CVT may be inadequate to absorb all of the energy associated with braking the machine in a timely manner. As a result, the efficiency of the machine during repeated loading cycles may suffer. Although additional loads and/or torque demands may be placed on the CVT and/or the engine to further assist with machine braking, known control systems are not configured to manage the combination of such loads such that the load cycle efficiency of the machine is maximized. Instead, traditional power systems including an engine and a CVT are controlled by measuring engine speed, and changing the ratio of the transmission to keep the engine within a defined speed range. Such systems typically focus on protecting machine components from damage caused by engine overspeed.

For example, U.S. Pat. No. 6,385,970 to Kuras et al. discloses a system that includes an engine, a hydraulic CVT, and a control system in communication with the engine and the CVT. The control system of the '970 patent is paired with a hydro-mechanical drive system that is operable to sense engine speed and create an output speed signal. The control system is further operable to compare the engine speed signal to an underspeed value and produce an error signal. The error signal is used to produce a command signal that controls the transmission ratio to manage the load on the engine.

While the control system of the '970 patent may incorporate various strategies to increase the amount of engine and/or CVT retarding torque available for braking the machine, and to protect the engine and CVT from overspeed damage during machine braking, the control system does not seek to minimize the time required to brake the machine during various loading and unloading cycles. As a result, the control system of the '970 patent does not optimize a loading cycle efficiency of the machine.

The present disclosure is directed towards overcoming one or more of the problems as set forth above.

SUMMARY OF THE INVENTION

In an exemplary embodiment of the present disclosure, a method of controlling a transmission associated with a machine includes determining a first target torque of the transmission. The first target torque is a combination of a torque limit associated with a power source of the machine and a virtual retarding torque. The method also includes directing the transmission to generate a first output corresponding to the first target torque at an interface between the transmission and the power source. The first output of the transmission increases a speed of the power source from a first power source speed to a second power source speed and decreases a travel speed of the machine from a first travel speed to a second travel speed. The method further includes determining that the first target torque is not equal to the torque limit, and determining a second target torque of the transmission in response to determining that the first target torque is not equal to the torque limit. The second target torque is less than the first target torque.

In an additional exemplary embodiment of the present disclosure, a method of controlling a transmission associated with a machine includes determining a first operating characteristic of a power source associated with the machine, and determining a first target torque of the transmission based on the first operating characteristic. The first target torque exceeds a power source torque threshold by an amount greater than or equal to a virtual retarding torque associated with the first target torque. The method also includes determining at least one additional target torque of the transmission, in a closed-loop manner, until a virtual retarding torque associated with the at least one additional target torque is equal to about zero.

In a further exemplary embodiment of the present disclosure, a machine includes a power source having a driven member, a transmission including a drive member operably connected to the driven member, and a parasitic load receiving power from at least one of the transmission and the power source. The machine also includes a control system in communication with the power source, the transmission, and the parasitic load. The control system is operable to determine a target torque of the transmission, in a closed-loop manner, based on a torque limit associated with the power source and a virtual retarding torque. The control system is also operable to direct the transmission to provide an output to the power source via the drive member corresponding to each respective target torque. The torque limit includes a combination of a power source torque threshold and an additional torque threshold associated with the parasitic load. In addition, the virtual retarding torque is based on a difference between power source speed and a power source speed threshold.

DETAILED DESCRIPTION

Figure 1:
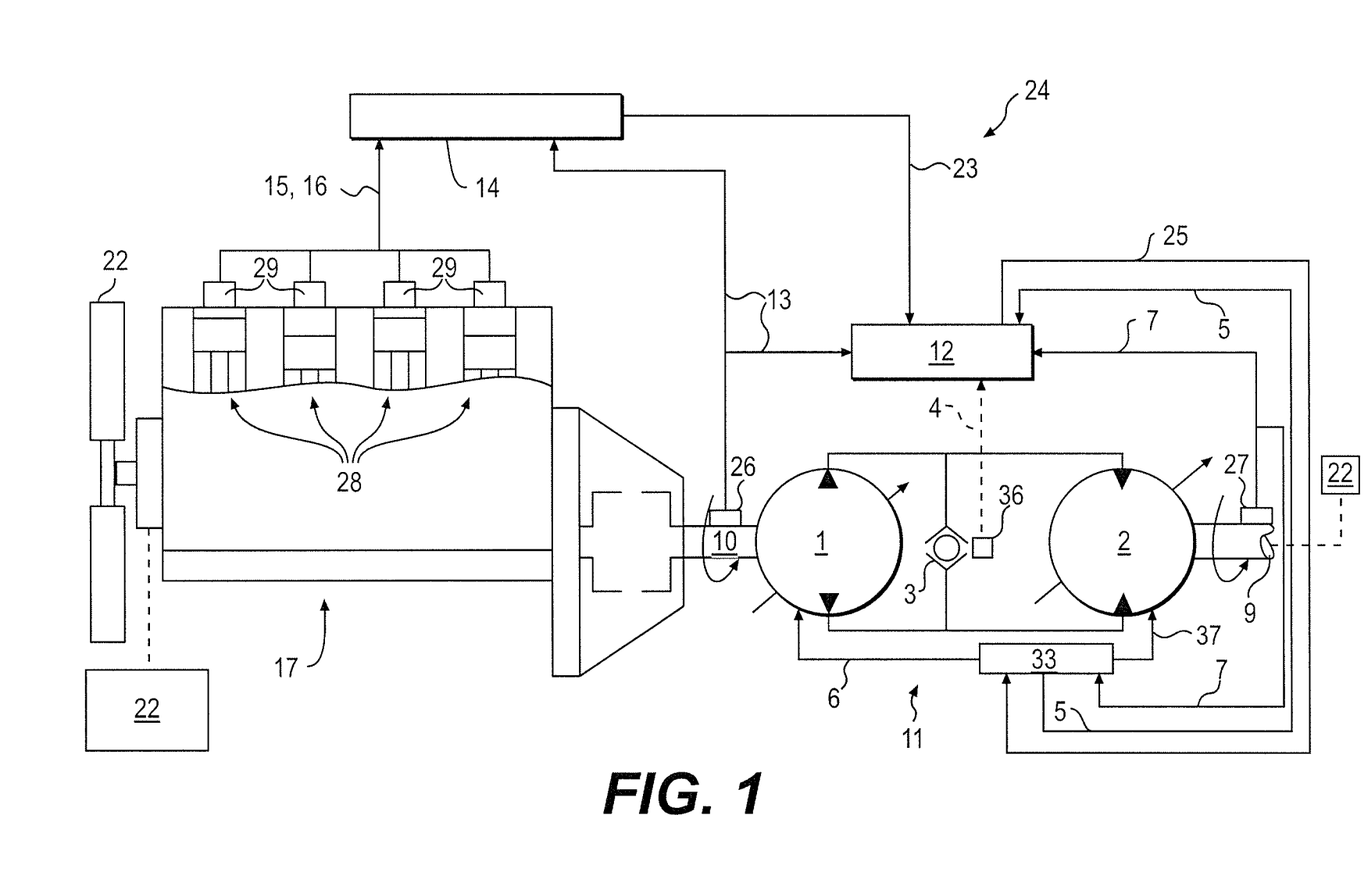
FIG. 1 is a schematic illustration of an exemplary embodiment of a transmission control system.

FIG. 1 illustrates an exemplary transmission control system 24 of the present disclosure. The transmission control system 24 may be used, for example, with a power source 17 and a transmission 11 associated with a machine (not shown). Such a machine may be, for example, any mobile or stationary machine used to perforin work or other tasks. Such exemplary machines may include, but are not limited to, wheel loaders, motor graders, track-type tractors, excavators, power generators, on-highway vehicles, off-highway vehicles, and/ or other like equipment. Such machines may be used to perform tasks in, for example, mining, excavating, construction, fanning, transportation, and/or other like environments or applications.

In the exemplary embodiment of FIG. 1, the power source 17 is an engine, such as an internal combustion engine. The engine may be a diesel engine, a gasoline engine, a natural gas engine, or any other engine readily apparent to one skilled in the art. It is contemplated that the transmission control system 24 may be used with other types of power sources such as, for example, fuel cells.

As illustrated in FIG. 1, the power source 17 may include a plurality of combustion chambers 28, and a fuel injector 29 may be associated with each combustion chamber 28. In the illustrated embodiment, the power source 17 includes four combustion chambers 28 and four associated fuel injectors 29. One skilled in the art will readily recognize, however, that power source 17 may include a greater or lesser number of combustion chambers 28, and that combustion chambers 28 may be disposed in an "in-line" configuration, a "V" configuration, or any other conventional configuration.

Figure 2:
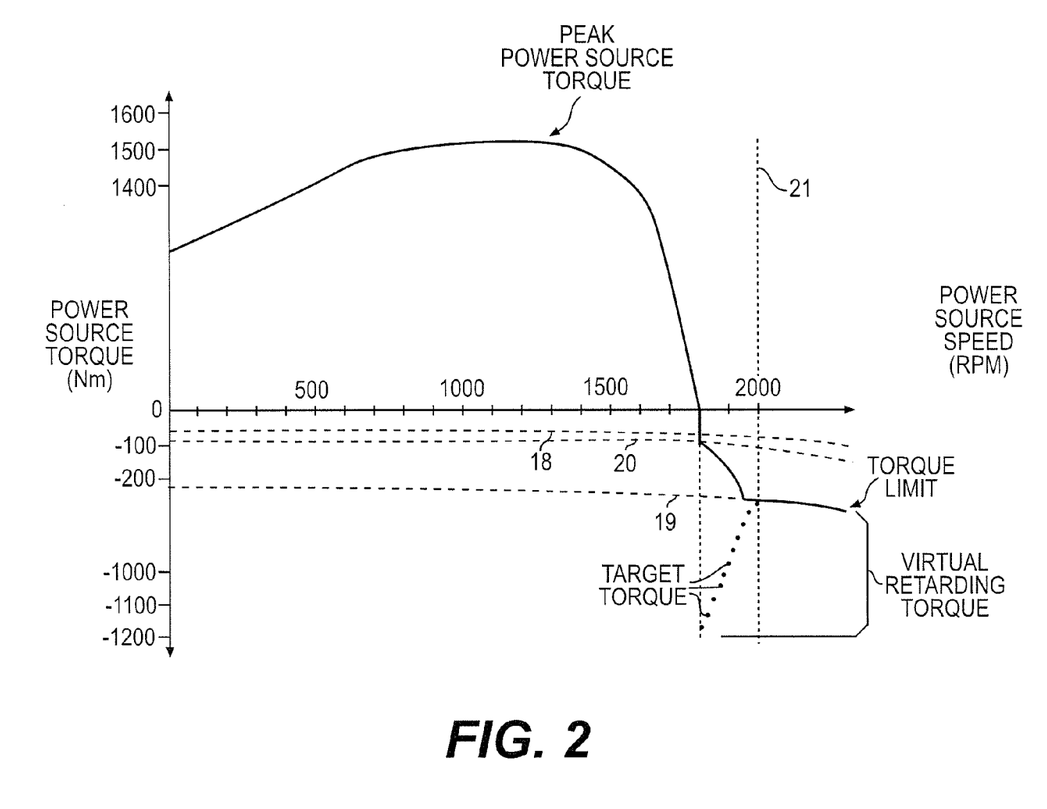
FIG. 2 is a graph illustrating a relationship between power source torque and power source speed according to an exemplary embodiment of the present disclosure.

The power source 17 may be configured to provide an output torque to the transmission 11 and/or other components of the machine across a range of power source speeds. FIG. 2 illustrates an exemplary torque curve of the power source 17. The torque curve of FIG. 2 illustrates a relationship between the speed of power source 17 and the resulting power source torque, according to an exemplary embodiment of the present disclosure.

As shown in FIG. 2, the power source 17 may have and/or may be characterized by a torque threshold 18. For the purposes of this disclosure, the "power source torque threshold" 18 may be defined as the maximum retarding torque that the power source 17 is capable of providing to the machine via the transmission 11. The power source 17 may be configured to provide such a retarding torque to assist in, for example, braking the machine with which the power source 17 is associated. It is understood that the retarding torques referred to herein may be directed to, for example, the wheels, tracks, and/or other traction devices of the machine, via the transmission 11 and/or the power source 17, to assist in such braking.

As shown in FIG. 2, the power source torque threshold 18 may be associated with a negative torque value. For example, in embodiments in which the power source 17 is used to assist in braking the machine, the torque output by the power source 17 may decrease from a positive peak torque value while the power source 17 is operating at approximately 1200 rpm, to the power source torque threshold 18 while the power source 17 is operating between approximately 1600 rpm and approximately 2000 rpm. Accordingly, as the torque output by the power source 17 decreases and approaches the power source torque threshold 18, the power source torque may change sign. As the power source torque increases in magnitude in the negative direction, such as from approximately 0 Nm to approximately −60 Nm, the retarding torque provided to the machine and/or transmission 11 by the power source 17 increases. As shown in FIG. 2, in exemplary embodiments, the power source torque threshold 18 may have a value between approximately −25 Nm and approximately −200 Nm. In further exemplary embodiments, the power source torque threshold 18 may have a value between approximately −50 Nm and approximately −100 Nm.

In exemplary embodiments, one or more machine components operably connected to, receiving power from, and/or otherwise associated with the power source 17 may also assist in providing a retarding torque during machine operation. For example, the transmission 11 may be coupled to the power source 17 through various known couplings, shafts, and/or other structures described in greater detail below. As a result, during operation of the machine, resistance and/or friction losses associated with movement of the gears, bearings, shafts, and/or other transmission components may additively contribute to the total retarding torque available for braking the machine. The cumulative retarding torque available from the power source 17 and the exemplary resistance and/or friction losses of the transmission 17 is represented by the combined power source and transmission torque threshold 20 illustrated in FIG. 2. It is understood that, for a given power source speed, the actual retarding torque value associated with the resistance and/or friction losses of the transmission 17 may be calculated as the difference between the power source torque threshold 18 and the combined power source and transmission torque threshold 20. In exemplary embodiments, such a retarding torque may have a value between approximately −25 Nm and approximately −100 Nm.

In addition, one or more parasitic loads 22 may be operatively coupled to, may receive power from, and/or may be otherwise associated with the power source 17 and/or the transmission 11. Such parasitic loads 22 may include, for example, a power source cooling fan, a hydraulic pump associated with an arm, tool, bucket traction device, rotation device, and/or other implement of the machine, and a hydraulic pump associated with the power source 17. During operation, such parasitic loads 22 may be a further source of retarding torque available for braking the machine. Such parasitic loads 22 may additively contribute to the total available retarding torque as described above with respect to the resistance and/or friction losses of the transmission 17. The cumulative retarding torque available from the power source 17, the exemplary resistance and/or friction losses of the transmission 17, and from simultaneous operation of all of the parasitic loads 22 associated with the power source 17 and/or the transmission 11 is represented by the parasitic load threshold 19 illustrated in FIG. 2. It is understood that, for a given power source speed, the actual retarding torque value associated with simultaneously operating all such parasitic loads 22 may be calculated as the difference between the combined threshold 20 and the parasitic load torque threshold 19. In exemplary embodiments, such a retarding torque may have a value between approximately −25 Nm and approximately −150 Nm.

Thus, the parasitic load torque threshold 19 may be representative of a torque limit associated with the machine. For the purposes of this disclosure, such a "torque limit" may be defined as the cumulative maximum retarding torque that the power source 17, the transmission 11, and the parasitic loads 22 described above are capable of providing for braking the machine without failure of a power source component, transmission component, parasitic load component, or a linkage associated with such components. It is understood that such retarding torque may increase in magnitude in the negative direction as the torque limit is approached. In exemplary embodiments, a torque limit associated with the power source 17 may comprise a combination of the power source torque threshold 18, and at least one additional torque threshold associated with a torque required by a parasitic load 22 receiving power from the power source 17. For example, as shown in FIG. 2, the torque limit associated with power source 17 may have a value equal to the combined power source and transmission torque threshold 20 and the parasitic load torque threshold 19. Thus, the torque limit may be a physical retarding threshold and/or capacity of the control system 24, beyond which, damage and/or failure may occur to one or more system components. In exemplary embodiments, the torque limit may be static, and may have a value between approximately −200 Nm and approximately −400 Nm. In still further exemplary embodiments, the torque limit may have a value between approximately −200 Nm and approximately −300 Nm.

With continued reference to FIG. 1, an input drive member such as, for example, a countershaft 10 may connect the power source 17 to the transmission 11 at an interface between the power source 17 and the transmission 11. The transmission 11 may also include an output driven member such as, for example, an output shaft 9. As described in greater detail below, the transmission 11 may convert an input rotation of countershaft 10 into an output rotation of output shaft 9. In this manner, power and/or torque generated by the power source 17 may be transmitted to the output shaft 9, and the output shaft 9 may transmit such power and/or torque to one or more parasitic loads 22 and to the various traction devices of the machine.

In additional exemplary embodiments, the transmission 11 may be configured to provide an input rotation of the countershaft 10 to the power source 17, thereby transmitting input power and/or torque to the power source 17. In exemplary embodiments, such input power and/or torque provided to the power source 17 by the transmission 11 may be used to assist in braking the machine. It is understood that the transmission 11 may comprise any known type of transmission, and in exemplary embodiments in which the transmission 11 is configured to provide power and/or torque to the power source 17, the transmission 11 may comprise a CVT. As shown in FIG. 1, the transmission 11 may be a hydraulic CVT. Alternatively, in additional exemplary embodiments, the transmission 11 may be an electric CVT or other type of CVT apparent to one skilled in the art.

A CVT generally consists of a driving element, a driven element, and a ratio controller 33. In the hydraulic CVT illustrated in FIG. 1, the driving element may be a pump 1, such as a variable displacement pump, and the driven element may be a motor 2, such as a variable displacement motor. In an electric CVT, on the other hand, the driving element may be an electric generator and the driven element may be an electric motor.

In the hydraulic CVT of FIG. 1, the ratio controller 33 may be configured to manipulate the displacement of the pump 1 with a pump command signal 6, and may be configured to manipulate the displacement of the motor 2 with a motor command signal 37. By manipulating displacements in this way, the ratio controller 33 may vary and/or otherwise control the output rotation of output shaft 9. The motor 2 may be fluidly connected to the pump 1 by conduits that supply and return fluid to and from the pump 1 and motor 2. As a result, the pump 1 may be configured to drive the motor 2 by fluid pressure. The transmission 11 may also include a resolver 3, allowing for a measurement of a pressure differential between the two conduits of supply and return fluid. The pressure differential between the two conduits and/or the displacement of the motor 2 may be used to determine an output torque of the transmission 11.

The ratio controller 33 may also be configured to control the ratio of the transmission output speed to the transmission input speed. In the exemplary embodiment shown in FIG. 1, the ratio controller 33 may be in communication with both the driving element and the driven element, and may adjust the ratio of the transmission output speed to the transmission input speed, as limited by the power output of the power source 17. When both output torque and output speed increases are demanded of the transmission 11, a demand for increased power is transmitted to the power source 17 by the ratio controller 33. Likewise, when both output torque and output speed decreases are demanded of the transmission 11, a demand for decreased power is transmitted to the power source 17.

The ratio of transmission output speed to transmission input speed, at a particular power source output power, may be controlled by manipulating the displacement of the pump 1 and motor 2. As the machine encounters a relatively rapid change in loading conditions such as, for example, a change from a high ground speed with a low load to a low ground speed with a high load, the ratio controller 33 may shift the ratio of the transmission 11 from a high speed output to a low speed output. It is understood that such a relatively rapid change in loading conditions may occur, for example, upon driving the machine into a pile of material with an empty bucket, lifting the bucket loaded with material, and backing the machine away from the pile of material in a reverse direction. When shifting from a high speed output to a low speed output, the ratio controller 33 may decrease the flow of fluid supplied to the motor 2 by decreasing the displacement of the pump 1 to reduce the torque load or power load of the power source 17. The ratio controller 33 may also increase the displacement of the motor 2 to decrease the load on the power source 17. If the machine encounters a reduction in load, the ratio controller 33 may increase the displacement of the pump 1 and may decrease the displacement of the motor 2. The increased displacement of the pump 1 combined with the decreased displacement of the motor 2 results in an increase in machine travel speed and a reduction in the available torque.

Alternatively, in an electric CVT, the ratio of transmission output speed to input speed, at a particular power source output power, may be controlled by manipulating a torque command signal to the electric motor described above. As the machine encounters a relatively rapid change in loading conditions such as, for example, changing from a high ground speed with a low load to a low ground speed with a high load, the ratio controller 33 may alter the torque command signal sent to the electric motor to produce additional torque. In turn, the electric motor may demand additional power capacity from the generator described above in the form of additional current.

As shown in FIG. 1, one or more sensors may be associated with the transmission 11, the power source 17, and/or the parasitic loads 22. These sensors may be configured to generate signals indicative of one or more operating characteristics of the transmission 11, the power source 17, and/or the parasitic loads 22, respectively. For example, in the hydraulic transmission 11 of FIG. 1, a pressure sensor 36 may be configured to provide a fluid pressure signal 4 from the resolver 3 to a transmission controller 12 associated with the transmission control system 24. In addition, a power source speed sensor 26 may be configured to produce a power source speed signal 13, and a transmission speed sensor 27 may be configured to produce a transmission speed signal 7. The speed sensors 26, 27 may be, for example, in the form of magnetic pick-up sensors configured to produce signals corresponding to the rotational speeds of the countershaft 10 and the output shaft 9, respectively. These sensors 26, 27 may also be capable of determining the angular position and/or direction of rotation of the countershaft 10 and output shaft 9. The speed sensors 26, 27 may provide the respective signals to the transmission controller 12 and/or to a power source observer 14 associated with the transmission control system 24.

The power source observer 14 and the transmission controller 12 may be operably connected and/or otherwise in communication with each other. Although FIG. 1 illustrates the transmission controller 12 and the power source observer 14 as being separate components of the transmission control system 24, in additional exemplary embodiments, the transmission controller 12 and the power source observer 14 may embody a single controller, microprocessor, and/or other known control component. Numerous commercially available microprocessors can be configured to perform the functions of the power source observer 14 and the transmission controller 12. One or both of the transmission controller 12 and the power source observer 14 may comprise memory and/or other storage components configured to retain data maps, look-up tables, algorithms, programs, sensed operating characteristics, and/or other information used to operate the machine and/or the transmission control system 24.

In exemplary embodiments, the transmission controller 12 and the power source observer 14 (i.e., the transmission control system 24) may use observed operating characteristics and/or signals received from one or more of the sensors described herein to determine one or more parameters associated with the transmission 11, the power source 17, the parasitic loads 22, and/or the machine. Such parameters may include but are not limited to, for example, an output torque generated by the power source 17, the output torque generated by the transmission 11, a target torque of the transmission 11, and a virtual retarding torque.

The power source observer 14 may be configured to monitor one or more operating characteristics of the power source 17 and/or to receive signals indicative of one or more such operating characteristics. For example, the power source observer 14 may receive the power source speed signal 13 described above with respect to power source speed sensor 26. In addition, the power source observer 14 may monitor the operation of the fuel injectors 29 through a power source fuel setting signal 15 and a power source fuel injection timing signal 16. Such signals may be provided to the power source observer 14 via one or more sensors (not shown) associated with the fuel injectors 29. In exemplary embodiments, the power source observer 14 may use one or more such inputs to estimate, calculate, and/or otherwise determine the output torque generated by the power source 17. In exemplary embodiments, the output torque of the power source 17 may also be determined based on, among other things, ambient temperature, ambient humidity, power source load, machine travel speed, and/or other known parameters. The determined power source torque may be sent to the transmission controller 12 via a torque signal 23.

The transmission controller 12 may be configured to monitor operating characteristics and/or receive signals indicative of one or more operating characteristics of the transmission 11 and/or the parasitic loads 22. For example, the transmission controller 12 may be configured to receive inputs including the transmission speed signal 7 from speed sensor 27, a pump and motor displacement signal 5 from ratio controller 33, and the fluid pressure signal 4 from pressure sensor 36. The transmission controller 12 may also receive the power source speed signal 13 discussed above with respect to the power source speed sensor 26, and the torque signal 23 generated by the power source observer 14. In exemplary embodiments in which the transmission 11 comprises an electric CVT, the transmission controller 12 may also be configured to receive inputs including, for example, a torque command signal from ratio controller 33, and the transmission speed signal 7 from transmission speed sensor 27. The transmission controller 12 may determine one or more parameters of the machine, the parasitic loads 22, and/or the transmission 11 based on such inputs, and may generate one or more control commands based on the determined parameters. For example, the transmission controller 12 may determine an output torque of the transmission 11 exerted on countershaft 10, through one or more torque algorithms, using the pump and motor displacement signal 5, the fluid pressure signal 4, the power source speed signal 13, and/or the torque signal 23 as algorithm inputs.

In further exemplary embodiments, the transmission controller 12 may be configured to determine one or more target torques associated with the power source 17. The power source output torque, transmission output torque, target torques, and/or other parameters described herein may be determined in an open-loop or a closed-loop manner by the control system 24. Such parameters may be used to assist in, for example, braking the machine and/or otherwise controlling the transmission 11, the power source 17, the parasitic loads 22, and/or other machine components. As used herein, the term "target torque" may be defined as a transmission output torque value that is determined to minimize the time required for the power source output torque to reach the torque limit. For example, as illustrated in FIG. 2, a unique target torque value may be calculated, estimated, and/or otherwise determined substantially continuously, sequentially, and/or at any time or power source speed interval. Such target torque values may be used to control operation of the transmission 11 and/or the power source 17 to assist in braking the machine under relatively heavy load conditions, and at any machine travel speed.

For example, the transmission controller 12 may direct the transmission 11 to rotate the countershaft 10 and/or the output shaft 9 at a speed corresponding to the one or more determined target torques. By rotating the counter shaft 10, and/or the output shaft 9 at such speeds, the transmission controller 12 may direct the transmission 11 to generate an output torque at the countershaft 10 and/or the output shaft 9 equal to the one or more target torques. In still further embodiments, the transmission controller 12 may direct the transmission 11 to generate any other known output indicative of, corresponding to, and/or equal to the one or more target torques. Such transmission outputs may be generated at, for example, any interface between the transmission 11 and the power source 17. Such transmission outputs may, for example, increase a speed of the power source 17 and/or decrease a travel speed of the machine.

In exemplary embodiments, one or more target torques may be determined in response to a signal indicative of a desired change in machine travel direction, such as from a forward direction to a reverse direction or from the reverse direction to the forward direction. One or more target torques may also be determined in response to determining that a grade of a surface on which the machine is located exceeds a grade threshold. Such travel direction, surface grade, and/or other determinations used to trigger determination of one or more target torques may be made by the transmission controller 12 using signals received from various sensors, control components, or other known devices associated with the machine.

In exemplary embodiments, one or more target torques may comprise a sum, a function, and/or any other arithmetic combination of the torque limit associated with the power source 17 and the virtual retarding torque. For example, as illustrated in FIG. 2, at a given power source speed, each target torque value may be equal to the sum of the static torque limit value and the virtual retarding torque. As used herein, the term "virtual retarding torque" may be defined as the amount, range, and/or magnitude of torque by which the target torque exceeds the torque limit. The virtual retarding torque may be a dynamic range of torque values, and the virtual retarding torque may be a function of power source speed. Collectively, the determined target torque values may be representative of the virtual retarding torque illustrated in FIG. 2, and the magnitude of the virtual retarding torque may go to zero as the power source torque approaches the torque limit.

In exemplary embodiments, the virtual retarding torque, and thus the individual target torque values collectively making up the virtual retarding torque, may be a function of power source speed. For example, the virtual retarding torque may be based on a difference between the power source speed and a power source speed threshold 21. As used herein, the "power source speed threshold" may be defined as the maximum speed at which the power source 17 may be operated before damaging a power source component or a component coupled to and/or otherwise driven by the power source 17. In exemplary embodiments, the magnitude of the virtual retarding torque may decrease as a difference between the power source speed and the power source speed threshold 21 decreases. In addition, the magnitude of the virtual retarding torque may decrease as, for example, the power source torque increases in magnitude in the negative direction (i.e., decreases). In particular, the magnitude of the virtual retarding torque may decrease as the retarding torque provided by the power source 17 increases to its maximum value at the torque limit. As noted above, the maximum retarding torque of the power source 17 may have a negative value at the torque limit. Additionally, when the power source 17 reaches the torque limit during, for example, a machine braking operation, the target torque may have a value equal to the torque limit. Further, when the target torque equals the torque limit, the virtual retarding torque may be about zero.

INDUSTRIAL APPLICABILITY

The disclosed systems and methods have wide applications in a variety of machines including, for example, wheel loaders and track-type tractors. The disclosed systems and methods may be implemented into any machine that utilizes a transmission to convert rotational speed of a power source into a drive speed for a traction device. For example, the disclosed systems and methods may be used by any machine employing a power source, a CVT, and/or one or more parasitic loads to assist in machine braking.

During an exemplary machine braking operation, such as an operation necessitating braking the machine at relatively high load, it may be necessary to selectively maximize the torque available for machine braking. However, maximizing such retarding torque does not happen instantaneously in mechanical systems. For example, it may take time (typically on the order of seconds) for the power source 17 to respond to a command requiring the power source 17 to reach the power source speed threshold 21 and/or to reach the torque limit. This time delay associated with maximizing the retarding torque available to the machine may hinder the productivity and load cycle efficiency of the machine, particularly, when the machine is used to perform tasks in which repetitive braking at relatively high loads is required.

Such tasks may include, for example, moving a pile of material from a first location to a second location different than the first location. In performing such a task, the machine may be directed to impact the pile at high speed and low load. Upon impact, an implement of the machine, such as a bucket, may be loaded with the material, and the travel speed of the machine may approach zero upon impacting the pile. The machine may then be directed to move in the reverse direction, away from the pile, at high load. At some point, the machine must then transition, at high load, from traveling in the reverse direction to traveling in a forward direction toward a desired material deposit location (i.e., the second location). In conjunction with activating one or more parasitic loads 22 thereon, the power source 17 and the transmission 11 may be used to assist in braking the machine during such high-load direction changes. It may be preferable to use these machine components to assist in braking the machine during high-load direction changes rather than, for example, using service brakes associated with the machine traction devices due to the power losses and other inefficiencies associated with the application of such service brakes.

To facilitate using the power source 17, transmission 11, and parasitic loads 22 to assist in braking the machine in high load situations, the exemplary control strategies of the present disclosure may increase power source speed to the power source speed threshold 21, based on closed-loop determinations of a virtual retarding torque. In such embodiments, the virtual retarding torque may comprise sequentially-determined target torque values that serve as transmission output torque commands. By actively controlling the output torque generated by the transmission 11 in a closed-loop manner using such target torque values, the power source retarding torque may be maximized as quickly as possible.

For example, the output torque generated by the transmission 11 based on such target torque values may minimize the time required for the power source 17 to reach the torque limit. In exemplary embodiments, the target torque values may be determined according to one or more control algorithms formulated to bring the power source 17 to the torque limit as quickly as possible without causing failure to the components and/or couplings associated with the power source 17, transmission 11, and parasitic loads 22. Such target torque values may also accelerate the speed of the power source 17 until the power source speed threshold 21 is reached. It is understood that in exemplary embodiments in which the power source speed increases beyond, for example, the power source speed threshold 21, exemplary control algorithms of the present disclosure may determine one or more target torque values having a positive sign and/or any other magnitude (positive or negative) to assist in reducing the power source speed to the power source speed threshold 21. Additionally, the target torque values may be determined so as to limit the rate at which the power source 17 approaches the target torque, thereby minimizing operator discomfort and/or material spillage caused by braking the machine too abruptly. For example, during an exemplary machine braking situation, the transmission control system 24 may activate one or more parasitic loads 22 sequentially to avoid abrupt machine braking and/or material spillage.

The systems and method of the present disclosure may be advantageous over known passive systems and methods employing a CVT for several reasons. For example, since such known systems and methods do not control the CVT based on dynamic torque targets such as the target torques making up the virtual retarding torque described herein, such systems and methods are not configured to minimize the time associated with braking the machine at high loads. Further, even if such known passive systems control operation of the power source based on a static target torque that exceeds a torque limit associated with the power source, and limit the power source speed once the torque limit is reached, such known systems still are able to avoid operator discomfort, material spillage, and/or other drawbacks associated with abrupt machine braking. An exemplary method of controlling a transmission 11 associated with a machine will now be explained with reference to the flow chart 100 illustrated in FIG. 3.

Figure 3:
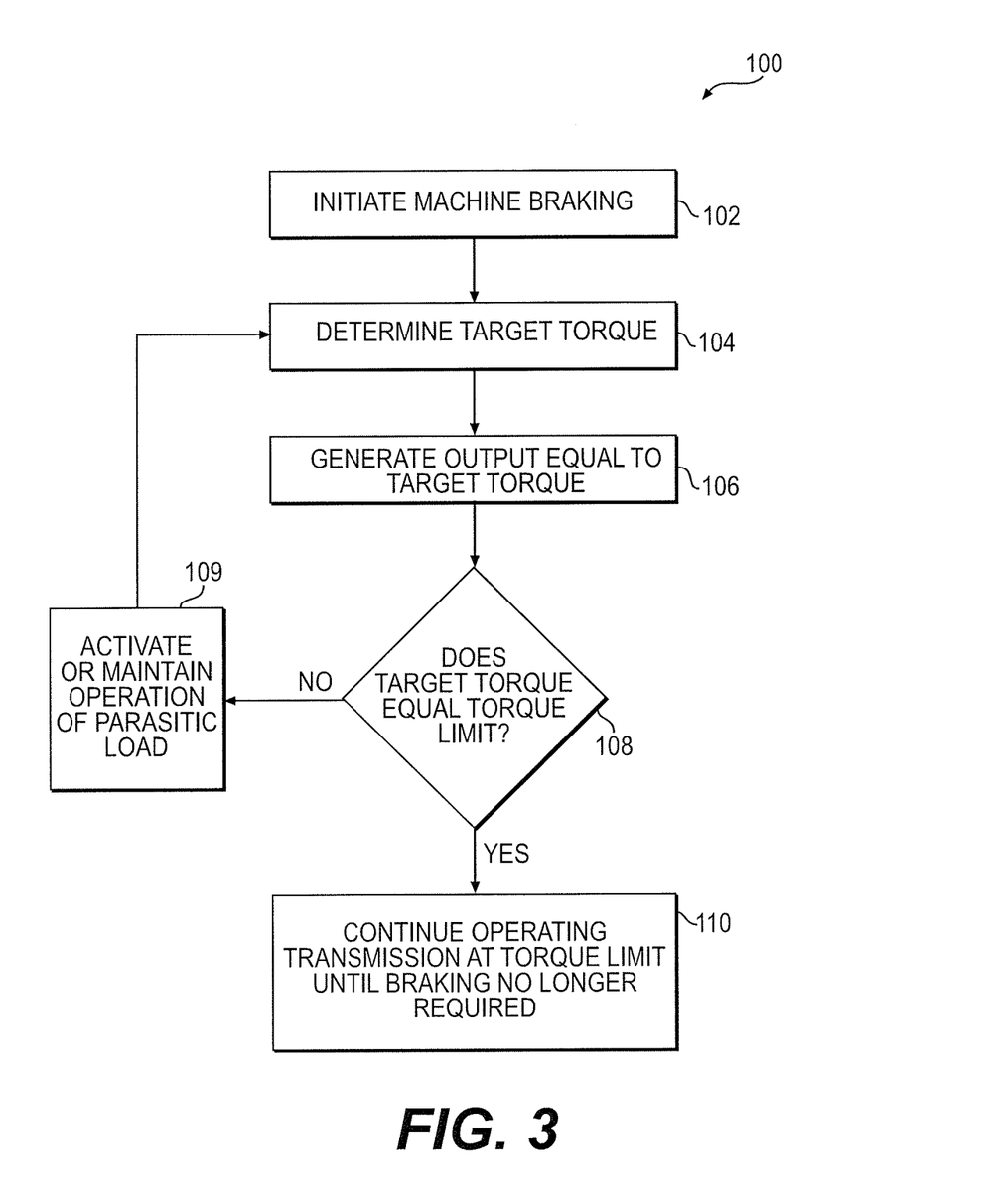
FIG. 3 is a flow chart illustrating an exemplary method of operating a transmission control system.

In an exemplary method of controlling a transmission 11 associated with a machine, machine braking may be initiated (Step: 102) in a number of ways. For example, one or more sensors associated with the machine may measure, detect, and/or otherwise determine a grade of a surface on which the machine is located. The sensors may send one or more signals indicative of the grade to the transmission controller 12 for comparison to a grade threshold. The transmission controller 12 may be configured to initiate machine braking at Step: 102 and/or perform one or more of the other steps shown in the flow chart 100 in response to a determination that the grade of the surface on which the machine is located exceeds the grade threshold. In such exemplary embodiments, the grade threshold may be indicative of either an inclined grade or a declined grade.

In further exemplary embodiments, machine braking may be initiated (Step: 102) in response to receipt of a signal by the transmission controller 12 indicative of a desired change in machine travel direction. For example, upon removing material from a pile and backing away from the pile, an operator of the machine may manipulate and/or otherwise transition a switch, lever, pedal, joystick, knob, forward-neutral-reverse selector and/or other like operator interface associated with the machine to change the travel direction of the machine from reverse to forward. The transmission controller 12 may be configured to initiate machine braking at Step: 102 and/or perform one or more of the other steps shown in the flow chart 100 in response to such a signal indicative of a change in desired travel direction. In addition, one or more sensors associated with the machine may substantially continuously sense the load on one or more implements of the machine. For example, such sensors may be configured to send signals indicative of implement load to the transmission controller 12. The transmission controller 12 may be configured to determine whether the implement, such as a bucket of the machine, is operating above a load threshold. The transmission controller 12 may be configured to initiate machine braking at Step: 102 in response to such a load determination in combination with receiving a signal indicative of a desired change in machine travel direction.

At Step: 104, the transmission controller 12 may determine a target torque of the transmission 11, such as a first target torque of the transmission 11. Such an exemplary first target torque may comprise a combination of the torque limit associated with the power source 17 and the virtual retarding torque described above. The transmission controller 12 may utilize one or more algorithms, maps, and/or look-up tables in determining the target torque at Step: 104. For example, the transmission controller 12 may use one or more of the fluid pressure signal 4, pump and motor displacement signal 5, transmission speed signal 7, power source speed signal 13, and/or torque signal 23 as inputs to one or more target torque algorithms, and the first target torque may be an output of such algorithms.

At Step: 106, the transmission controller 12 may direct the transmission 11 to generate an output at the countershaft 10 corresponding and/or equal to the first target torque generated at Step: 104. For example, the transmission 11 may rotate the countershaft 10 at a speed enabling the countershaft 10 to deliver an output torque to the power source 17 that is equal to the first target torque. The rotation of the countershaft 10 and/or other output of the transmission 11 may have the effect of increasing a speed of the power source 17 from a first power source speed to a second power source speed greater than the first. In addition, the rotation of the countershaft 10 and/or other output of the transmission 11 may have the effect of decreasing the travel speed of the machine from a first travel speed to a second travel speed less than the first travel speed. Thus, the transmission may use the first target torque to assist in braking the machine.

At Step: 108, the transmission controller 12 may determine whether the target torque determined at Step: 104 is equal to the torque limit associated with the power source 17. For example, if the transmission controller 12 determines that the first target torque does equal the torque limit (Step: 108—Yes), the transmission controller 12 may continue to operate the transmission 11 at the torque limit until braking of the machine is no longer required (Step: 110). The transmission controller 12 may determine that braking is no longer required in a variety of ways, such as, for example, upon receiving a signal from a throttle pedal position sensor and/or from one or more operator interfaces indicative of a desire to accelerate the machine, or to change a travel direction of the machine from forward to reverse.

Alternatively, if the transmission controller 12 determines that the first target torque does not equal the torque limit (Step: 108—No), the transmission controller 12 may return to Step: 104, and may sequentially determine at least one additional target torque until a first of the additional target torques is equal to the torque limit. For example, in response to determining that the first target torque is not equal to the target torque, the transmission controller 12 may return to Step: 104 and may determine a second target torque of the transmission 11. In exemplary embodiments, the virtual retarding torque may decrease as the speed of the power source 17 increases toward the power source speed threshold 21, thus, the second target torque may be less than (i.e., may have a greater magnitude in the negative direction than) the first target torque. Sequentially determining additional target torques until a first of the additional target torques equals the torque limit may assist in braking the machine by maximizing the retarding torque available for braking in as little time as possible. Additionally, the one or more algorithms employed at Step: 104 may be configured to limit the rate at which retarding torque is applied to, for example, the traction devices of the machine and/or other components. Thus, while assisting in minimizing the time required to brake the machine during, for example, high-load direction changes, such algorithms may be tuned to avoid machine jerking, material spillage, and/or other drawbacks associated with relatively abrupt braking.

In further exemplary embodiments, the transmission control system 24 and/or other control systems associated with the machine may activate or maintain operation of a parasitic load 22 associated with the power source 17 and/or the transmission 11 (Step: 109) in response to determining that the first target torque is not equal to the torque limit (Step: 108—No). In exemplary embodiments, such parasitic loads 22 may be activated sequentially. For example, a first parasitic load 22 may be activated at Step: 109 in response to a first determination made at Step: 108, and a second parasitic load 22 may be activated at Step: 109 in response to a subsequent second determination made at Step: 108. Alternatively, such parasitic loads 22 may be activated based on the speed of the power source 17. For example, if machine braking has been initiated at Step: 102, a first parasitic load 22 may be activated in response to the power source 17 reaching a first power source speed, and a second parasitic load 22 may be activated in response to the power source 17 reaching a second power source speed greater than the first power source speed. The sequential activation of such parasitic loads 22 may assist in braking the machine by increasing the load demand on the power source 17 and/or the transmission 11. Additionally, such sequential activation may result in a more gradual braking of the machine than simultaneous activation of more than one parasitic load 22. Thus, such sequential parasitic load activation may assist in avoiding operator discomfort and/or other inefficiencies associated with braking the machine abruptly.

As described above, control of the transmission 11, power source 17, and/or parasitic loads 22 described herein may continue in a closed-loop manner, in accordance with the methods illustrated in flow chart 100, until machine braking is no longer required. With reference to Step: 104, it is understood that once a second target torque has been generated, the transmission controller 12 may direct the transmission 11 to generate a second output equal to the second target torque at the interface between the transmission 11 and the power source 17 (Step: 106). As described above with respect to the first target torque, such an output may comprise rotation of the countershaft 10 at a speed enabling the countershaft 10 to deliver an output torque to the power source 17 equal to the second target torque. This rotation of the countershaft 10 and/or other output of the transmission 11 may have the effect of increasing a speed of the power source 17 from the second power source speed to a third power source speed greater than the second. In addition, the rotation of the countershaft 10 and/or other output of the transmission 11 may have the effect of decreasing the travel speed of the machine from the second travel speed to a third travel speed less than the second travel speed.

Moreover, in such closed-loop control methods, once the transmission controller 12 determines that the second, third, and/or subsequent additional target torque generated at Step: 104 is equal to the torque limit (Step: 108—Yes) the speed of the power source 17 may be increased to the power source speed threshold 21. This speed increase may be driven by the transmission 11 through an increase in the rotation speed and/or output torque of the countershaft 10. This speed increase may also be affected by directing one or more speed increase commands from the transmission control system 24 and/or other machine control systems to the power source 17. In addition, once the transmission controller 12 determines that the second, third, and/or subsequent additional target torque generated at Step: 104 is equal to the torque limit (Step: 108—Yes) the torque required and/or demanded by one or more of the parasitic loads 22 described herein may be increased to the corresponding parasitic load torque threshold 19. Such an increase in the torque required by the parasitic load 22 may further assist in machine braking.

It is understood that one or more of the target torques generated at Step: 104 may be determined based on at least one operating characteristic of the power source 17, the transmission 11, and/or one or more of the parasitic loads 22. For example, a first operating characteristic of the power source 17, including power source speed, power source load, and/or power source torque may be determined by the power source observer 14 using any of the signals 13, 15, 16 and/or other inputs from the sensors described herein. In exemplary embodiments, such inputs may include a load signal received by the power source observer 14 and/or the transmission controller 12 from a load sensor associated with a bucket or other implement of the machine. During such closed-loop control, one or more additional operating characteristic may be determined by the power source observer 14 and/or the transmission controller 12. Moreover, one or more additional target torques may be determined at Step: 104, in a closed loop manner, based on such additional operating characteristics. Such a method of control may continue as outlined in the flow chart 100 shown in FIG. 3 until, for example, machine braking is no longer required. In addition, such additional target torques may be determined at Step: 104 until a virtual retarding torque associated with one of the additional target torques is equal to about zero. A virtual retarding torque equal to about zero may be indicative of the corresponding additional target torque having a value equal to the torque limit. A virtual retarding torque equal to about zero may also be indicative of a power source speed having a value equal to the power source speed threshold 21.

It is understood that, for example, a virtual retarding torque equal to about zero, a target torque having a value equal to the torque limit, and/or a power source speed having a value equal to the power source speed threshold 21 may indicate that the combined machine braking and/or retarding capabilities of the power source 17, transmission 11, and parasitic loads 22 have been maximized. Further, the active closed-loop determination of one or more target torques may assist in minimizing the time required to brake the machine. Minimizing the time associated with braking the machine in this way may improve, for example, machine efficiency during high-load direction changes and/or other like braking operations.

Other embodiments of the invention will be apparent to those skilled in the art from consideration of the specification, and practice of the systems and methods disclosed herein. It is intended that the specification and examples be considered as exemplary only, with a true scope of the invention being indicated by the following claims.

What is claimed is:
1. A method of controlling a transmission associated with a machine, comprising:
  determining a first target torque of the transmission,
    wherein the first target torque comprises a combination of a torque limit associated with a power source of the machine and a virtual retarding torque;
  directing the transmission to generate a first output corresponding to the first target torque at an interface between the transmission and the power source, wherein the first output of the transmission increases a speed of the power source from a first power source speed to a second power source speed and decreases a travel speed of the machine from a first travel speed to a second travel speed;
  determining that the first target torque is not equal to the torque limit; and
  determining a second target torque of the transmission in response to determining that the first target torque is not equal to the torque limit, wherein the second target torque is less than the first target torque.

2. The method of claim 1, wherein the virtual retarding torque is determined based on a difference between the first power source speed and a power source speed threshold.

3. The method of claim 1, wherein the virtual retarding torque decreases as a torque of the power source decreases.

4. The method of claim 1, wherein the virtual retarding torque decreases as a difference between power source speed and a power source speed threshold decreases.

5. The method of claim 1, wherein the torque limit comprises a combination of a power source torque threshold and at least one additional torque threshold associated with a parasitic load receiving power from the power source.

6. The method of claim 1, further including determining the first target torque in response to a signal indicative of a desired change in machine travel direction.

7. The method of claim 1, further including determining the first target torque in response to a determination that a grade of a surface on which the machine is located exceeds a grade threshold.

8. The method of claim 1, further including activating a parasitic load associated with the power source in response to determining that the first target torque is not equal to the torque limit.

9. The method of claim 1, further including directing the transmission to generate a second output corresponding to the second target torque at the interface between the transmission and the power source,
wherein the second output of the transmission increases the speed of the power source from the second power source speed to a third power source speed greater than the second power source speed, and decreases the travel speed of the machine from the second travel speed to a third travel speed less than the second travel speed.

10. The method of claim 1, further including sequentially determining at least one additional target torque of the transmission until a first of the additional target torques is equal to the torque limit.

11. The method of claim 1, further including determining that the second target torque is equal to the torque limit;
increasing the speed of the power source to a power source speed threshold; and
increasing a torque demanded by a parasitic load receiving power from the power source to a parasitic load torque threshold, wherein the speed of the power source and the torque demanded by the parasitic load are increased in response to determining that the second target torque is equal to the torque limit.

12. A method of controlling a transmission associated with a machine, comprising:
determining a first operating characteristic of a power source associated with the machine;
determining a first target torque of the transmission based on the first operating characteristic, wherein the first target torque exceeds a power source torque threshold by an amount greater than or equal to a virtual retarding torque associated with the first target torque; and
determining at least one additional target torque of the transmission, in a closed-loop manner, until a virtual retarding torque associated with the at least one additional target torque is equal to about zero.

13. The method of claim 12, further including determining the at least one additional target torque of the transmission until a first of the additional target torques is equal to a torque limit associated with the power source, wherein the torque limit has a magnitude greater than the power source torque threshold.

14. The method of claim 13, wherein the torque limit comprises a combination of the power source torque threshold and an additional torque threshold associated with a parasitic load receiving power from the power source.

15. The method of claim 12, wherein the virtual retarding torque is based on a difference between power source speed and a power source speed threshold.

16. The method of claim 12, wherein the first operating characteristic comprises at least one of a power source speed, a power source load, and a power source torque.

17. The method of claim 12, wherein the first target torque exceeds the power source torque threshold by an amount equal to a combination of the virtual retarding torque associated with the first target torque and at least one additional torque threshold associated with a parasitic load receiving power from the power source.

18. A transmission control system, comprising:
a power source including a driven member;
a transmission including a drive member operably connected to the driven member;
a parasitic load receiving power from at least one of the transmission and the power source; and
a control system in communication with the power source, the transmission, and the parasitic load, wherein the control system is operable to
determine a target torque of the transmission, in a closed-loop manner, based on a torque limit associated with the power source and a virtual retarding torque, and
direct the transmission to provide an output to the power source via the drive member corresponding to each respective target torque, wherein the torque limit comprises a combination of a power source torque threshold and an additional torque threshold associated with the parasitic load, and wherein the virtual retarding torque is based on a difference between power source speed and a power source speed threshold.

19. The system of claim 18, wherein the parasitic load comprises at least one of a power source fan and an implement pump operably connected to the power source.

20. The system of claim 18, wherein the power source comprises a diesel engine, and the transmission comprises one of an electric continuously variable transmission and a hydraulic continuously variable transmission, the system further including at least one sensor configured to determine an operating characteristic of the diesel engine and to direct a signal indicative of the operating characteristic to the control system.

* * * * *

UNITED STATES PATENT AND TRADEMARK OFFICE
CERTIFICATE OF CORRECTION

| | | |
|---|---|---|
| PATENT NO. | : 8,491,444 B1 | Page 1 of 1 |
| APPLICATION NO. | : 13/436084 | |
| DATED | : July 23, 2013 | |
| INVENTOR(S) | : Li et al. | |

It is certified that error appears in the above-identified patent and that said Letters Patent is hereby corrected as shown below:

In the Specification,

Column 3, line 14, delete "perforin" and insert -- perform --.

Column 3, line 20, delete "fanning" and insert -- farming --.

Signed and Sealed this
Twenty-fifth Day of August, 2015

Michelle K. Lee
*Director of the United States Patent and Trademark Office*